US012592976B2

(12) United States Patent
Clark et al.

(10) Patent No.: US 12,592,976 B2
(45) Date of Patent: Mar. 31, 2026

(54) REMOTE DESKTOP CONNECTION COMMUNICATIONS

(71) Applicant: Hewlett-Packard Development Company, L.P., Spring, TX (US)

(72) Inventors: Cassandra Ellen Clark, Fort Collins, CO (US); Eric John Gressman, Fort Collins, CO (US); Lucas Lemos Rosa, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/555,440

(22) PCT Filed: Jun. 28, 2021

(86) PCT No.: PCT/US2021/039329
§ 371 (c)(1),
(2) Date: Oct. 13, 2023

(87) PCT Pub. No.: WO2023/277859
PCT Pub. Date: Jan. 5, 2023

(65) Prior Publication Data
US 2024/0214434 A1 Jun. 27, 2024

(51) Int. Cl.
H04L 65/1069 (2022.01)
G06F 9/451 (2018.01)
(Continued)

(52) U.S. Cl.
CPC .......... H04L 65/1069 (2013.01); G06F 9/452 (2018.02); H04L 47/801 (2013.01); H04L 65/1089 (2013.01)

(58) Field of Classification Search
CPC ............. H04L 65/1069; H04L 65/1089; H04L 47/801; G06F 9/452
(Continued)

(56) References Cited

U.S. PATENT DOCUMENTS 10,757,079 B2 * 8/2020 Schmidt .............. H04L 65/1069
2011/0107409 A1 5/2011 Wilkinson et al.
(Continued)

FOREIGN PATENT DOCUMENTS

CN 112631710 A 4/2021
TW 201202951 A 1/2012
WO WO-2019135773 A1 * 7/2019 ........... G06F 9/5055

*Primary Examiner* — Glenford J Madamba
(74) *Attorney, Agent, or Firm* — Quarles & Brady LLP

(57) ABSTRACT

In an example in accordance with the present disclosure, a computing device is described. The computing device includes a processor and a memory communicatively coupled to the processor and storing executable instructions. The instructions, when executed cause the processor to run a connection broker module to assign a host device to a remote device for a remote desktop connection. The host device is assigned from a pool of host devices available to host the remote desktop connection. The instructions, when executed cause the processor to run a remote desktop module to establish the remote desktop connection between the host device and the remote device. The instructions, when executed cause the processor to establish a communication channel between the connection broker module and the remote desktop module to exchange messages associated with the remote desktop connection.

21 Claims, 7 Drawing Sheets

(51) Int. Cl.
    *H04L 47/80*      (2022.01)
    *H04L 65/1089*   (2022.01)
(58) Field of Classification Search
    USPC .......................................................... 709/206
    See application file for complete search history.

(56)            References Cited

U.S. PATENT DOCUMENTS

| | | |
|---|---|---|
| 2012/0124183 A1 | 5/2012 | Long et al. |
| 2013/0340063 A1 | 12/2013 | Larsson |
| 2015/0058969 A1* | 2/2015 | Ringdahl ............ H04L 12/4675 |
| | | 726/15 |
| 2015/0200932 A1 | 7/2015 | Wilkinson et al. |
| 2015/0244787 A1* | 8/2015 | Fausak .................... H04L 67/56 |
| | | 709/203 |
| 2016/0381031 A1 | 12/2016 | Mcmichael, IV et al. |
| 2020/0228606 A1* | 7/2020 | San ....................... H04L 67/143 |
| 2021/0367901 A1 | 11/2021 | Singh et al. |

* cited by examiner

Computing Device
100

Processor
102

Memory
104

Connection Broker Runner
106

Remote Desktop Runner
108

Communication Channel
Establisher
110

318

System
212

Remote Desktop
Module
216

Connection Broker
Module
214

626

| Machine-Readable Storage Medium | 728 |
|---|---|
| 730 | Assign Instructions |
| 732 | Start Instructions |
| 734 | Add Instructions |
| 736 | Send Instructions |

*Fig. 7*

REMOTE DESKTOP CONNECTION COMMUNICATIONS

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 7 depicts a non-transitory machine-readable storage medium for managing remote desktop connections, according to an example of the principles described herein.

Figure 1:
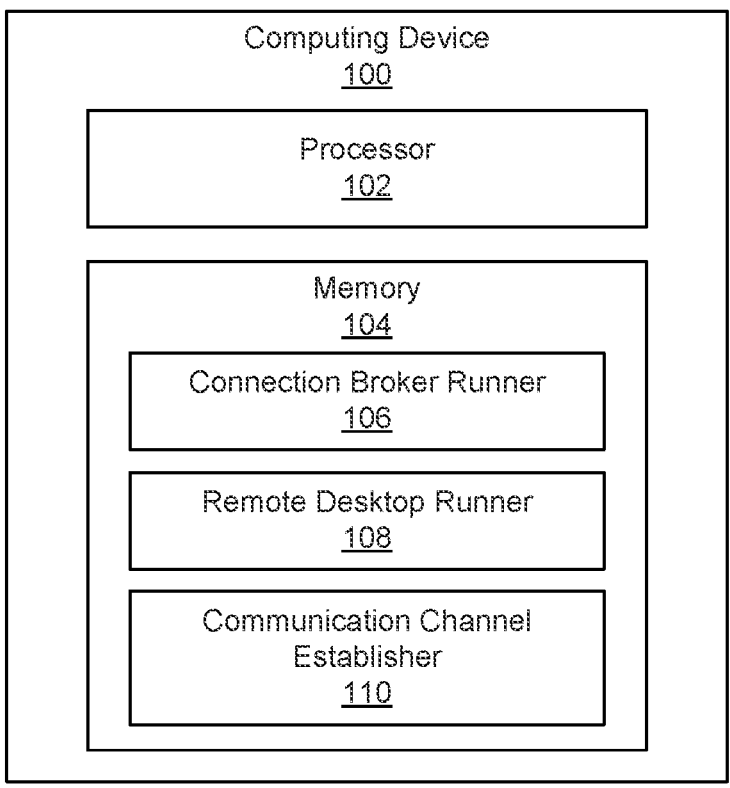
FIG. 1 is a block diagram of a computing device for managing remote desktop connections, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices have become commonplace in today's society and are used in a variety of contexts. In one particular context, a user at one computing device accesses the processing resources and applications of a computing device at another location. For example, a host device may include applications, datastores, and other resources. A user at a remote device may access the host device over a network to gain access to host device applications and datastores. In this example, modules or agents on both the host and remote device facilitate this remote computing device access.

While such remote networks greatly expand the utility of computer networks and computer usage in general, some developments may improve their useability. For example, such a network may be implemented in an organization or enterprise with many remote devices and host devices. In these settings, an administrator of the network may be tasked with monitoring and managing the host device resources and the remote desktop connection network. The difficulty of this task increases with each additional remote and host computing device. A network of subscribing devices may become so large as to be entirely unworkable.

For example, without knowledge of remote desktop activity, a host management system may not be able to track resource usage. In one example, in an example network, a host device may be "checked out" by a remote device for use by the remote device. In another example, a host management system may assign the host device to a particular user or user account that accesses the host device via the remote device. Once checked out, the host device then becomes unavailable for use by another remote device. However, it may be the case that the remote device in this instance becomes inactive or idle, yet the host device may remain "checked out." As such, not only is this host device unavailable for other remote devices to access, the host device is not being used by the remote device to which it is connected. This represents resource waste. While some management systems may attempt to acquire information about the operating system state of the host device, such as whether a host device is booted to the operating system or whether a user is logged in, such information may be insufficient to aid in efficient remote desktop connection management.

Accordingly, the present specification provides a computing device, system, and non-transitory machine-readable storage medium to provide enhanced remote desktop connection communications. Specifically, the present computing device provides information regarding the status of remote desktop connections to host computing devices. This information may be used to facilitate connection management and monitoring. For example, host computing devices may be automatically returned to the control of a connection manager responsive to an event indicating a user is finished with their use of the host computing device. Some examples of events indicating a user is finished with their use of the host computing device may include the closing of the remote desktop session or a remote connection idle state.

Specifically, the present computing device includes 1) a remote desktop module to facilitate an interaction between the remote device and the host device and 2) a connection broker module to assign available host devices to remote devices. In this case, the remote desktop module and the connection broker module are independent of one another yet communicate with one another to facilitate host device pool management. In an example for establishing a communication channel, the connection between the remote desktop module and the connection broker module may be established as the remote desktop module publishes a unique endpoint identifier to a secure location of the file system to be consumed by the connection broker module and allowing the connection broker module to initiate communication with the remote desktop module when the connection broker module comes online. It should be noted that other mechanisms may be used to implement a communication channel between the remote desktop module and the connection broker module.

These modules communicate with one another to provide information used to manage the established remote desktop connection and other remote desktop connections. That is, a host management system with access to the remote desktop module may enable more intelligent resource utilization as the host manager is able to re-acquire host devices that are unused, either because no remote device is connected over the remote desktop connection or because there is no input activity on the remote desktop connection. The information may also indicate how heavily or lightly host device resources are being used, based on whether users are connecting to the host devices over a remote desktop connection. This may trigger certain organizational actions such as allocating host device resources and managing inventory of host devices. In addition to those functionalities described above, this customizable, internal communication system between the host management system (i.e., the connection broker module) and the remote desktop protocol (i.e., the remote desktop module), may provide certain additional functionality such as showing management notifications to a subset of remote devices connected to the host computing device; preventing collaboration connections based on management policy; and preventing unwanted connections from users without an authorized token.

Specifically, the present specification describes a computing device. The computing device includes a processor and a memory communicatively coupled to the processor and storing executable instructions. The instructions when executed cause the processor to run a connection broker module to assign a host device to a remote device for a remote desktop connection. In this example, the host device is assigned from a pool of host devices available to host the remote desktop connection. The instructions when executed cause the processor to run a remote desktop module to establish the remote desktop connection between the host device and the remote device. The instructions when executed cause the processor to establish a communication channel between the connection broker module and the remote desktop module to exchange messages associated with the remote desktop connection.

The present specification also describes a system. The system includes a connection broker module to assign a host device, from a pool of host devices available to host the remote desktop connection, to a remote device for a remote desktop connection. The system also includes a remote desktop module to establish the remote desktop connection between the host device and the remote device. In an example, the connection broker module is to establish a communication channel with the remote desktop module to exchange messages for managing the remote desktop connection.

The present specification also describes a non-transitory machine-readable storage medium including a set of instructions executable by a processor resource. The instructions are executable to assign, using a connection broker module, a host device to a first remote device for a remote desktop connection, the host device being assigned from a pool of host devices available to host the remote desktop connection. The instructions are also executable by the processor resource to start the remote desktop connection between the host device and the first remote device using a remote desktop module. The instructions are also executable by the processor resource to add a second remote device to the remote desktop connection using the remote desktop module and send a message from the remote desktop module to the connection broker module indicating that the second remote device has joined the remote desktop connection.

As used in the present specification and in the appended claims, the term "a number of" or similar language is meant to be understood broadly as any positive number including 1 to infinity.

As used in the present specification and in the appended claims, the term "processor" may be a controller, an application-specific integrated circuit (ASIC), a semiconductor-based microprocessor, a central processing unit (CPU), and a field-programmable gate array (FPGA), and/or other hardware device.

As used in the present specification and in the appended claims, the term "memory" may include a machine-readable storage medium, which machine-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

Turning now to the figures, FIG. 1 is a block diagram of a computing device 100 for managing remote desktop connections, according to an example of the principles described herein. As described above, the computing device 100 includes a processor 102. The processor 102 of the computing device 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may be executed on hardware circuitry; however, the hardware circuitry is not dedicated. The hardware circuitry may be in a shared environment where utilization is time sliced. Virtual machines (VMs) may be implementations of virtualized logical processors.

The computing device 100 may include a memory 104 communicatively coupled to the processor 102. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic random-access memory (DRAM) or other hardware implementations for storing processor instructions. Additionally, the virtualized logical memory may be implemented in an abstraction layer which allows the instructions to be executed on a virtualized logical processor, independent of any dedicated hardware implementation.

The computing device 100 may also include instructions, which are stored on the memory 104 and are executable by the processor 102. The instructions may be implemented in a platform specific language that the processor 102 may decode and execute. The instructions may be stored in the memory 104 during execution. The instructions may include operations executable by the processor 102 to manage a remote desktop connection, according to the examples described herein.

In some examples, the processor 102 may execute a connection broker runner 106 to run a connection broker module to assign a host device to a remote device for a remote desktop connection. In some examples, the connection broker module may assign the host device to a user. The user may establish a remote connection to the host device after it is assigned to them. In some examples, the user may use whatever remote device they want. However, the connection broker module may have no awareness of the specific remote device used by the user without communication provided by the remote desktop module, as described herein.

Within a computer network there may be a pool of host devices. Each host device in the pool may be capable of providing a remote connection to a remote device. Each of the host devices may have similar characteristics, i.e., similar hardware components and/or similar applications and datastores. In another example, the different host devices have different characteristics. In either case, the connection broker runner 106 instructions may select from among the pool, a particular host device which is to host the remote desktop connection. Such an assignment may be based on any number of criteria, such as availability of different host devices within the pool and the specific resources of the different host devices. In one particular example, a user may specify the host device by some unique identifier. In this example assignment of a particular host device may be based on user input. In an example, the connection broker runner 106 may establish certain parameters for the remote desktop session. For example, the connection broker runner 106 may designate a period of time during which the host device is "checked out" to the remote device.

Once designated for a particular remote desktop connection, the processor 102 may execute a remote desktop runner 108 to run a remote desktop module to establish the remote desktop connection between the host device and the user device. That is, once a host device has been assigned, a remote connection is established such that the remote device has access to the complement of resources provided by the host device. The remote desktop runner 108 instructions establish such a connection, which is a connection by which data may be transferred between the remote device and the host device to which it is connected.

In an example remote desktop establishment procedure, a user may use a web interface (e.g., provided by the connection broker module) to check out a host device. After the user checks out the host device using the web interface, the user may see the host device in their active sessions on the web interface. The user may click a button on the web interface to connect to the active session host device. The button may display a modal that prompts them to download and install the connection broker client on their remote device. If the connection broker client is already installed on the remote device, the button may direct the remote device to a given universal resource locator (URL). The given URL may be registered with the remote device operating system when the connection broker client was installed. The given URL may be recognized by the operating system to launch the connection broker client from the web browser. When the connection broker client gets launched by the given URL, the given URL may also include a hostname to which the remote device is to start a remote connection. The connection broker client may launch a remote connection receiver on the remote device with the supplied hostname and may automatically begin the remote desktop connection. The user may provide any additional authorization credentials that are used to finalize the remote desktop connection with the host device.

Throughout the remote desktop session, the remote desktop runner 108 may also monitor and track the status of the remote desktop session. For example, the remote desktop runner 108 may monitor an operating system (OS) state to detect when the OS of the host device is active or inactive. While particular reference is made to a particular usage statistic, i.e., OS state, other usage statistics may be collected by the remote desktop runner 108. As will be described below, these usage statistics may be implemented when managing the host devices in the pool.

The processor 102 may also execute a communication channel establisher 110 to establish a communication channel between the connection broker module and the remote desktop module to exchange messages associated with the remote desktop connection. The messages transmitted between these two modules facilitate effective host device management. For example, whether or not a host device is idle and/or whether the remote device has been connected are examples of information monitored by the remote desktop runner 108 and which may be used by the connection broker runner 106. Via the communication channel, this and other information may be used by a connection broker module to manage the host device that is coupled to the remote device as well as subsequent interactions between any host device and any remote device. Furthermore, the communication channel may facilitate monitoring of the remote desktop by the connection broker.

As a particular example, the connection broker module may receive usage statistics from the remote desktop module associated with the remote desktop connection. Such usage statistics may indicate the utilization of the resources of the host device and may also include timestamps associated with periods of utilization. Some examples of usage statistics that may be generated by the remote desktop module and received by the connection broker module include: the bandwidth usage of the remote connection over time; the number of involuntary disconnections due to network interruptions that the remote desktop module detected; the number of collaborators joining the session; and the amount of time the session was idle.

In yet another example of usage statistics, the remote desktop module may report if it detects a high rate of changes in pixels on the remote desktop screen during the remote connection. The rate of pixel changes may be an indication of the user performing a heavy graphics workload. Thus, the remote desktop module may monitor and report its own pixel scraping to the connection broker module.

As such, network administrators may monitor user experience and trends across the network infrastructure. The collected information may aid when the infrastructure must be expanded or reduced to suit the operating environment. As such, the message communication system provides the unique ability of the computing device 100 to collect specific statistics and metrics directly from the remote desktop module. That is, the communication channel provides the computing device 100 with the ability to query information from the remote desktop module and utilize the information to manage the pool of host devices.

Figure 2:
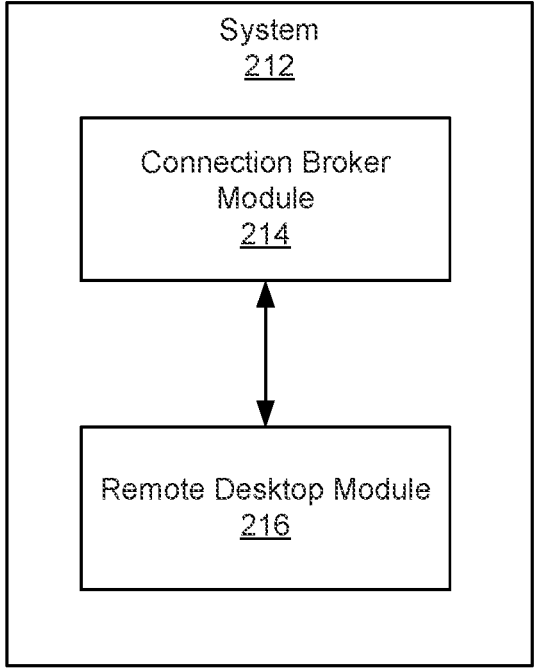
FIG. 2 is a block diagram of a system for managing remote desktop connections, according to an example of the principles described herein.

FIG. 2 is a block diagram of a system 212 for managing remote desktop communications, according to an example of the principles described herein. In an example, the system 212 may be disposed on the computing device 100. Each of the components depicted in FIG. 2 may include a processor and memory. That is, each component may include a processor, an application-specific integrated circuit (ASIC), a semiconductor-based microprocessor, a central processing unit (CPU), and a field-programmable gate array (FPGA), and/or other hardware device.

The memory may include a machine-readable storage medium, which machine-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

As described above, the connection broker module 214 assigns a host device, from a pool of host devices available to host a remote desktop connection, to a user device for the remote desktop connection. That is, the connection broker module 214 identifies which of multiple host devices may be best suited to provide a remote device with a remote connection. As described above, such an assignment may be based on any number of criteria including host device load, host device availability, and/or user indication of a particular host device to be connected. It should be noted that these are some of the criteria that may be used to assign a host device, and other criteria may be used to determine how to assign a host device from the pool of host devices.

The system 212 also includes a remote desktop module 216 that manages the remote desktop connection. That is, the remote desktop module 216 may be the interface through which the remote device communicates and accesses the resources of the host device. In addition to providing this interface, the remote desktop module 216 may monitor the state of the connection, tracking such information as resource utilization, host device state, login state, etc. For example, the remote desktop module 216 may determine for what periods of time the remote device and the host device are active. Such usage may be tracked via any number of monitors including a keystroke monitor and a processor monitor among others.

In addition to assigning a host device to the remote device, the connection broker module 214 may also establish a communication channel with the remote desktop module 216. That is, the remote desktop module 216 and the connection broker module 214 may communicate with one another to exchange information therebetween, which information may be used to manage the pool of host devices and the remote desktop connection between the remote device and the host device. That is, as described above the remote desktop module 216 may monitor and collect information regarding resource usage and the state of the various resources of the remote device and the host device. Via the communication channel between the connection broker module 214 and the remote desktop module 216, this information may be utilized to manage the pool of host devices and currently active host devices. As a particular example, based on an indication from a remote desktop module 216 that a remote desktop connection is inactive, the connection broker module 214 may sever the remote desktop connection such that the host device may be returned to the pool where another remote device may be coupled thereto for a remote desktop connection.

As depicted in FIG. 2, the connection broker module 214 and the remote desktop module 216 may be separate applications executed by the processor 102 of the computing device 100. That is, each module may have different functionalities and may be controlled independently. Accordingly, as depicted in FIG. 2, the system 212 may include these separate applications, but may facilitate communication between the two to carry out the intended functionality of remote connection management.

Figure 3:
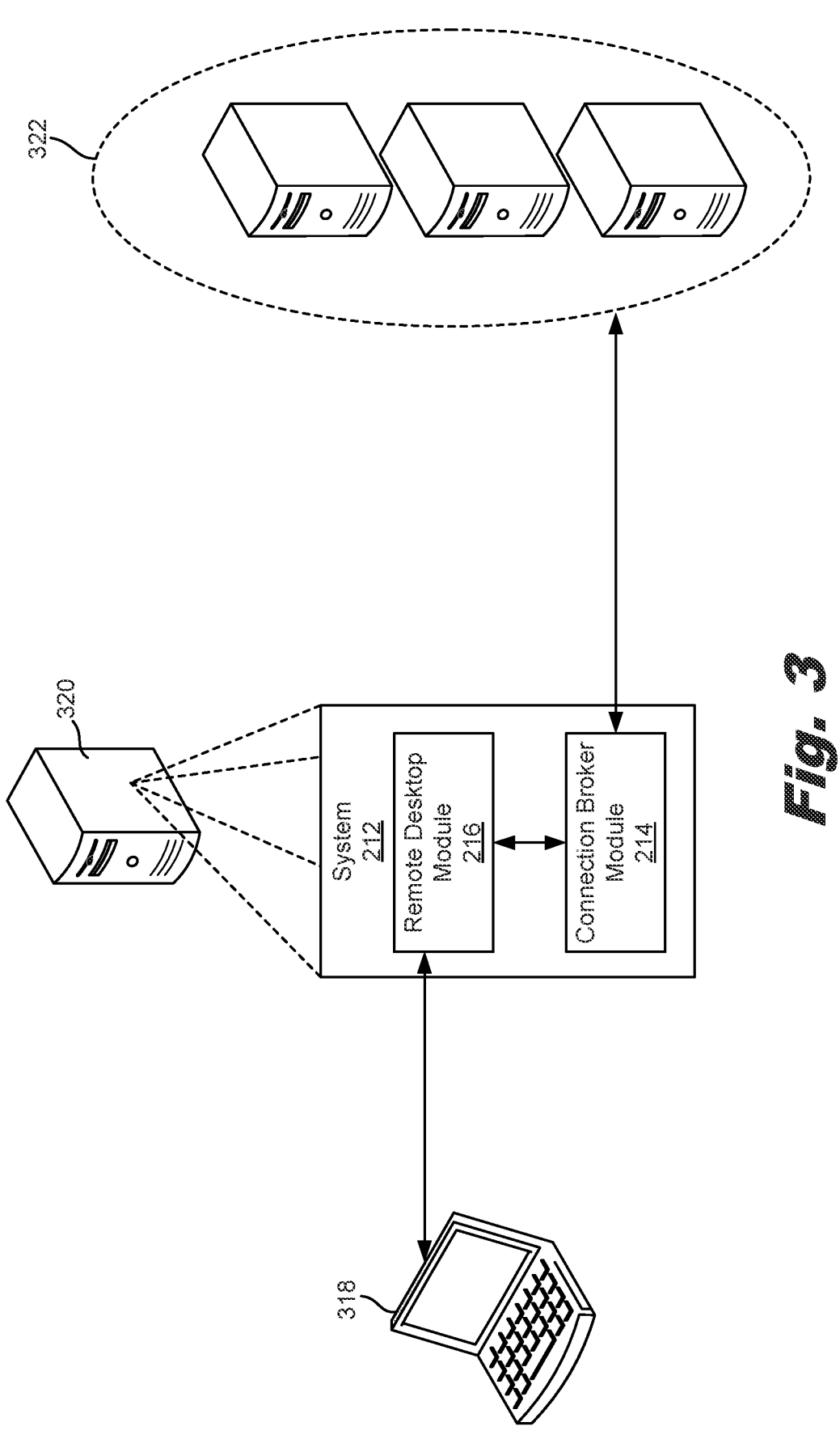
FIG. 3 depicts an environment of a computing device and system for managing remote desktop connections, according to an example of the principles described herein.

FIG. 3 depicts an environment of a host device 320 and system 212 for managing remote desktop connections, according to an example of the principles described herein. As described above, in this environment, a remote device 318 may be put in communication with the host device 320. The host device 320 may be an example of the computing device 100 described in connection with FIG. 1, which computing device 100 may include the system 212 described in connection with FIG. 2.

In this environment, there may be a pool 322 of host devices, each of which are capable for assignation to the remote device 318 to establish a remote desktop connection. The connection broker module 214 may assign a particular device (i.e., the host device 320) from the pool 322 as the host device 320 to which the remote device 318 is assigned. In an example, the connection broker module 214 may also return an assigned host device 320 to the pool 322, for example when the host device 320 is not being actively utilized by the remote device 318.

Specifically, the connection broker module 214 may return an assigned host device 320 to the pool 322 of host devices in response to receiving a message from the remote desktop module 216. That is, the remote desktop module 216, in monitoring the connection between the remote device 318 and the host device 320 may determine that a remote connection is no longer being used. As a particular example, the connection broker module 214 may receive a message from the remote desktop module 216 indicating that the remote device 318 has disconnected from the remote desktop connection. In this example, the connection broker module 214 may sever the connection between the remote device 318 and the host device 320 and return an assigned host device 320 to the pool 322, where it may be utilized in a different remote desktop connection. Accordingly, rather than remaining paired to, and unused by the remote device 318, this assigned host device 320 may be made available for use by another remote device 318. As such, in this environment, the system 212 provides for a more effective utilization of host device resources.

In another example, the connection broker module 214 is to receive a message from the remote desktop module 216 that the remote desktop connection is idle. That is, there may be a connection between the remote device 318 and the assigned host device 320, but the host device resources, for example the OS and/or the processor of the host device, may be inactive. An indication that the host device 320 is inactive may be indicative of user inactivity and that the assigned host device 320 may be returned to the pool of host devices. Again, doing so may increase the efficacy of network management as a host device 320, rather than remaining unused, is returned to a pool 322 where it may potentially be utilized in another remote desktop connection.

Figure 4:
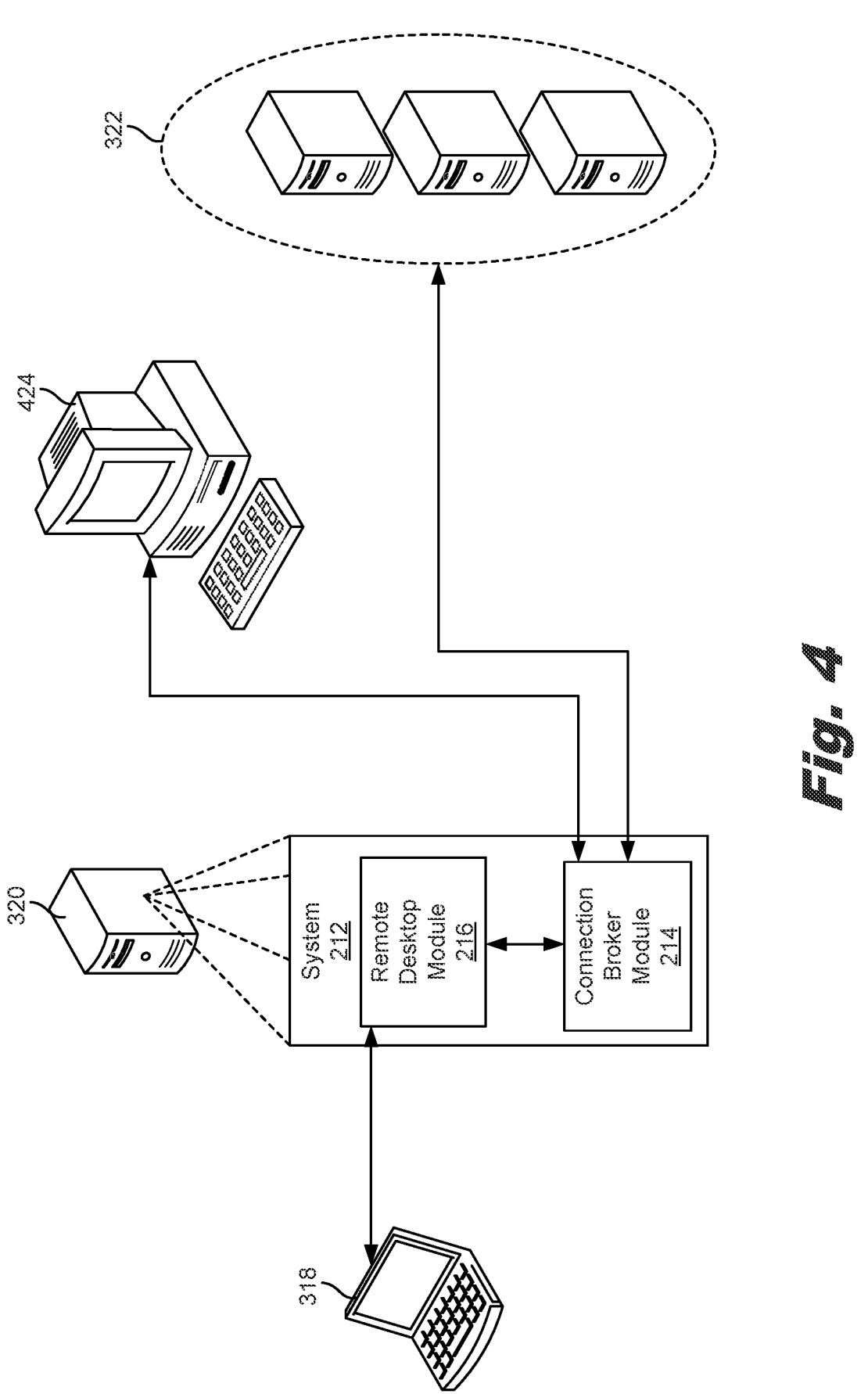
FIG. 4 depicts an environment of a computing device and system for managing remote desktop connections, according to an example of the principles described herein.

FIG. 4 depicts an environment of a computing device 320 and system 212 for managing remote desktop connections, according to an example of the principles described herein. As described above, the system 212 in general manages a remote desktop connection based on communicated information between the remote desktop module 216 and the connection broker module 214. Specifically, the connection broker module 214 may receive a message from the remote desktop module 216 indicating that the remote device 318 is connected to the host device 320 through the remote desktop connection. In this example, the indication of the connection is saved, for example on a database of the system 212 or host device 320.

In a particular example, in addition to establishing a connection, the connection broker module 214 may seek to terminate a remote desktop connection. For example, it may be that an administrator, via an administrative computing device 424 desires to perform maintenance on the assigned host device 320. As such, the administrative computing device 424 may transmit a request to remove the assigned host device 320 from service so as to perform the scheduled maintenance. However, in so doing, the administrative computing device 424 may inadvertently sever the remote connection between the host device 320 and the remote device 318. Such a disconnect may be unknown at the remote device 318 and could interrupt workflow and potentially lead to an irreversible data loss. Accordingly, in this example, the connection broker module 214 may prevent this disconnect. Specifically, responsive to such a request to disconnect the host device 320 from the remote desktop connection, the connection broker module 214 may retrieve the saved indication and determine that the host device 320 is actively connected to a remote device 318. The connection broker module 214 may provide a notification to this effect. Specifically, the connection broker module 214 may generate a notification that the remote device 318 is connected to the host device 320 and that if the requested disconnect is performed, negative consequences may result. In this manner, the communication channel between the remote desktop module 216 and the connection broker module 214 may avoid causing disruptions to users who are actively using host resources.

Figure 5:
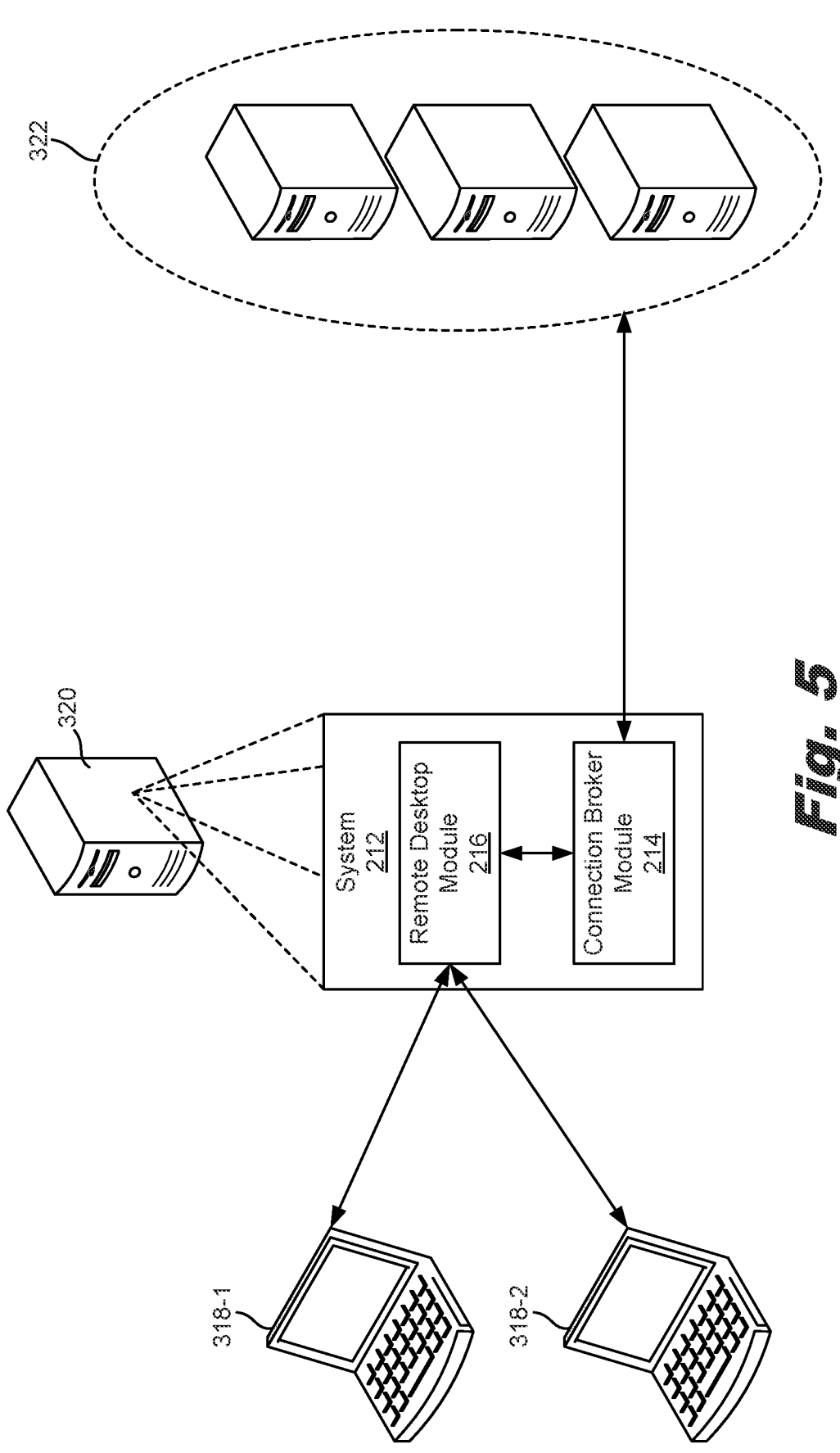
FIG. 5 depicts an environment of a computing device and system for managing remote desktop connections, according to an example of the principles described herein.

FIG. 5 depicts an environment of a computing device 320 and system 212 for managing remote desktop connections, according to an example of the principles described herein. In some examples, it may be the case that multiple remote devices 318-1, 318-2 desire to establish a remote connection with a host device 320. The system 212 of the present specification facilitates such an environment. That is, the remote desktop module 216 may establish a remote desktop connection between a first remote device 318-1 and the host device 320 and may also establish a remote desktop connection between a second remote device 318-2 and the host device 320.

In this example, the remote desktop module 216 may monitor the remote connection between each of the first and second remote devices 318-1 and 318-2. Specifically, the remote desktop module 216 may receive a request for a collaborator at the second remote device 318-2 to join the remote desktop connection with the host device 320. In this example, the remote desktop module 216 may send a request to the connection broker module 214 to verify whether the collaborator is allowed to join the remote desktop connection. This verification may be based on a user identifier (e.g., a username) of the collaborator user. For example, the connection broker module 214 may compare the username of the collaborator user to a connection database to see if the collaborator user has permission to access the host device. The remote desktop module 216 may receive a response from the connection broker module 214 indicating whether the collaborator is allowed to join the remote desktop connection and may accept or deny the request for the collaborator to join based on the management policy of the connection broker module 214. As such, not only does the system 212 provide remote desktop management, but provides security to any remote desktop management by enforcing access rights against those remote devices 318 intending to establish a data connection with the host device 320.

That is, the existence of a message communication system between the connection broker module 214 and the remote desktop module 216 may facilitate sophisticated control of remote access to host devices 320. For example, a token may be generated by the remote desktop module 216 or by the connection broker module 214. The token may be exchanged between the connection broker module 214 and the remote desktop module 216. The token may allow just one remote device 318 who has a host device 320 checked out to be allowed to remotely access it. In another example, the token may indicate that multiple remote devices 318 may be authorized to collaborate through the remote desktop module 216. That is, some organizations may have security protocols for pools 320 of host devices 320 to allow certain collaborators to join the remote desktop connection. In this case, a message communication system may query the connection broker module 214 to check if a particular user should be allowed to collaborate, thus creating a centralized location where such policies could be stored.

In addition to providing notifications to administrators, the system 212 may also provide notifications to users of the remote devices 318. For example, the connection broker module 214 may send a notification to the remote desktop module 216, which may be forwarded to the remote devices 318. The notification may be of a variety of types. For example, the notification may indicate a state of the host device 320 or may indicate to the user that a period of time for which the user has reserved the host device 320 is about to expire. While one particular example of a notification is provided, other types of notifications may be provided to the remote devices 318.

In some examples, the remote desktop module 216 may display the notification on certain remote devices 318, but not others. For example, the remote desktop module 216 may display the notification to a first remote device 318-1, but may prevent the display of the notification on a second remote device 318-2. As a particular example, the connection broker module 214 may inform the remote desktop module 216 when the reservation for the host device 320 is ending. The remote desktop module 216 may communicate this notification to an agent on the first remote device 318-1 to notify a first user that the reservation is ending, while preventing such notification from being passed to the second remote device 318-2. In this manner, if the first user is presenting to collaborators, the collaborators will not have the details of what is happening with the host device 320 reservation. As such, the present system may exclusively inform a target user while shielding collaborators from seeing these messages.

Figure 6:
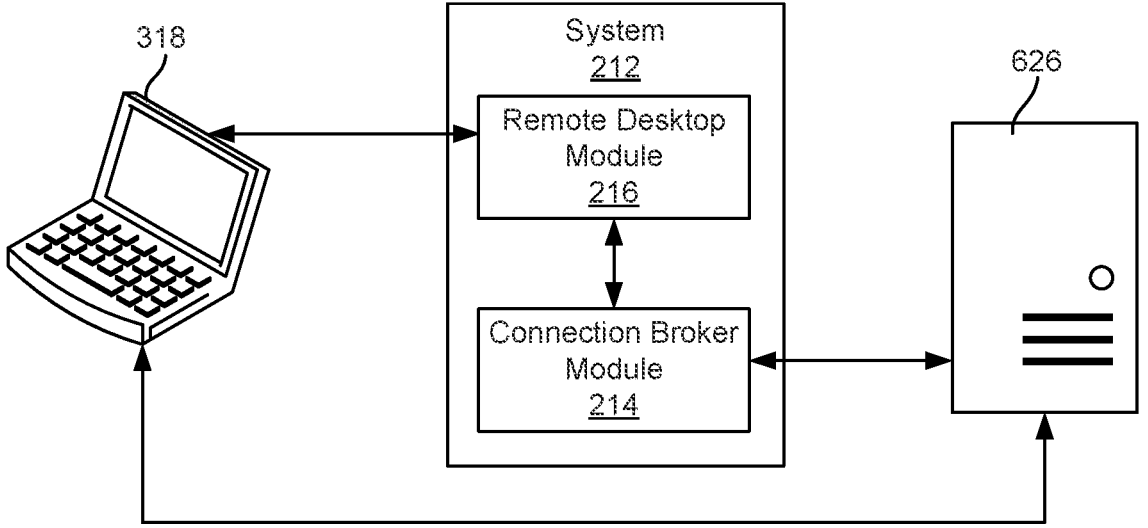
FIG. 6 depicts an environment of a computing device and system for managing remote desktop connections, according to an example of the principles described herein.

FIG. 6 depicts an environment of a computing device and system 212 for managing remote desktop connections, according to an example of the principles described herein. As described above, the present system 212 may provide security for a remote desktop session by restricting connections to just those parties with authorized tokens.

In an example, a token may be generated by a connection broker module 214 or by the remote desktop module 216. The token may be communicated between the remote desktop module 216 and the connection broker module 214 using the message communication system, but may also be communicated using other channels, such as a secure location on the file system of the system 212. The token may be sent from the connection broker module 214 to the connection manager 626.

The remote device 318 may obtain the token from the connection manager 626. The remote device 318 may provide the token to an agent on the remote device 318, which presents the token to the remote desktop module 216 during establishment of the remote connection session.

FIG. 7 depicts a non-transitory machine-readable storage medium 728 for managing remote desktop connections, according to an example of the principles described herein. To achieve its desired functionality, the computing device 100 includes various hardware components. Specifically, the computing device 100 includes a processor 102 and a machine-readable storage medium 728. The machine-readable storage medium 728 is communicatively coupled to the processor 102. The machine-readable storage medium 728 includes a number of instructions 730, 732, 734, 736 for performing a designated function. In some examples, the instructions may be machine code and/or script code.

The machine-readable storage medium 728 causes the processor 102 to execute the designated function of the instructions 730, 732, 734, 736. The machine-readable storage medium 728 can store data, programs, instructions, or any other machine-readable data that can be utilized to operate the computing device 100. Machine-readable storage medium 728 can store machine readable instructions that the processor 102 of the computing device 100 can process, or execute. The machine-readable storage medium 728 can be an electronic, magnetic, optical, or other physical storage device that contains or stores executable instructions. Machine-readable storage medium 728 may be, for example, Random-Access Memory (RAM), an Electrically Erasable Programmable Read-Only Memory (EEPROM), a storage device, an optical disc, etc. The machine-readable storage medium 728 may be a non-transitory machine-readable storage medium 728.

Referring to FIG. 7, assign instructions 730, when executed by the processor 102, cause the processor 102 to assign, using a connection broker module 214, a host device 320 to a first remote device 318-1 for a remote desktop connection, the host device 320 being assigned from a pool 322 of host devices available to host the remote desktop connection. Start instructions 732, when executed by the processor 102, cause the processor 102 to start the remote desktop connection between the host device 320 and the first remote device 318-1 using a remote desktop module 216. Add instructions 734, when executed by the processor 102, cause the processor 102 to add a second remote device 318-2 to the remote desktop connection using the remote desktop module 216. Send instructions 736, when executed by the processor 102, cause the processor 102 to send a message from the remote desktop module 216 to the connection broker module 214 indicating that the second remote device 318-2 has joined the remote desktop connection. It should be noted that this example describes two remote devices 318-1, 318-2 joining the remote desktop connection, in other examples any number of remote devices may join the remote desktop connection as collaborators.

What is claimed is:

1. A computing device, comprising:
   a processor; and
   a memory communicatively coupled to the processor and storing executable instructions that when executed cause the processor to:
      run a connection broker module to receive usage statistics from each host device of a pool of host devices available to host a remote desktop connection, the usage statistics being generated by a remote desktop module, the usage statistics including a rate of pixel change or an amount of time the remote device is idle during a remote desktop session;
      assign, by the connection broker module, a host device of the pool of host devices to a remote device for the remote desktop connection based on the usage statistics of the host device, wherein the usage statistics of the host device indicates a utilization of resources of the host device;

run the remote desktop module to establish the remote desktop connection between the host device and the remote device; and establish a communication channel between the connection broker module and the remote desktop module to exchange messages associated with the remote desktop connection.

2. The computing device of claim 1, wherein the connection broker module is to return an assigned host device to the pool of host devices in response to receiving a message from the remote desktop module on the communication channel.

3. The computing device of claim 1, wherein the connection broker module is to:
   receive a message from the remote desktop module indicating that the remote device has disconnected from the remote desktop connection; and
   return an assigned host device to the pool of host devices in response to receiving the message.

4. The computing device of claim 1, wherein the connection broker module is to:
   receive a message from the remote desktop module indicating that the remote desktop connection is idle; and
   return an assigned host device to the pool of host devices in response to receiving the message.

5. The computing device of claim 1, wherein the connection broker module is to:
   manage the pool of host devices and assignment of the pool of host devices based on collected usage statistics.

6. The computing device of claim 1, wherein the connection broker module is to:
   receive a message from the remote desktop module comprising an indication that the remote device is connected to the remote desktop connection; and
   save the indication that the remote device is connected to the remote desktop connection.

7. The computing device of claim 6, wherein the connection broker module is to:
   receive a request to end the remote desktop connection;
   determine, responsive to the request, that the remote device is connected to the remote desktop connection based on a saved indication; and
   generate a notification that the remote device is connected to the remote desktop connection.

8. The computing device of claim 1, wherein the connection broker module and the remote desktop module are separate applications executed by the processor.

9. A system, comprising:
   a processor to;
   assign, using a connection broker module stored in a memory of a computing device, a host device, from a pool of host devices available to host a remote desktop connection, to a remote device for a remote desktop connection based on usage statistics of the host device, wherein the usage statistics of the host device indicates a utilization of resources of the host device, the usage statistics being generated by a remote desktop module, the usage statistics including a rate of pixel change or an amount of time the remote device is idle during a remote desktop session; and
   establish, using a remote desktop module, the remote desktop connection between the host device and the remote device,

wherein the connection broker module is to establish a communication channel with the remote desktop module to exchange messages for managing the remote desktop connection.

10. The system of claim 9, wherein the remote desktop module is to:

receive a request for a collaborator to join the remote desktop connection with the host device from a second remote device;

send the request to the connection broker module to verify whether the collaborator is allowed to join the remote desktop connection; and receive a response from the connection broker module indicating whether the collaborator is allowed to join the remote desktop connection.

11. The system of claim 10, wherein the remote desktop module is to:

accept or deny the request for the collaborator to join the remote desktop connection based on a management policy of the connection broker module.

12. The system of claim 9, wherein the remote desktop module is to:

receive a token generated by the connection broker module to allow the remote device to join the remote desktop connection.

13. The system of claim 9, wherein the remote desktop module is to:

generate a token to allow the remote device to join the remote desktop connection; and send the token to the connection broker module, wherein the connection broker module allows the remote device to join the remote desktop connection based on the token.

14. A non-transitory computer-readable medium storing specific computer-executable instructions that, when executed by a processor of a computing device, cause the computing device to at least:

assign, using a connection broker module stored in a memory of the computing device, a host device to a first remote device for a remote desktop connection, the host device being assigned from a pool of host devices available to host the remote desktop connection based on usage statistics of the host device, wherein the usage statistics of the host device indicates a utilization of resources of the host device, the usage statistics being generated by a remote desktop module, the usage statistics including a rate of pixel change or an amount of time the remote device is idle during a remote desktop session;

start the remote desktop connection between the host device and the first remote device using the remote desktop module stored in the memory of the computing device;

add a second remote device to the remote desktop connection using the remote desktop module; and send a message from the remote desktop module to the connection broker module indicating that the second remote device has joined the remote desktop connection.

15. The non-transitory computer-readable medium of claim 14, wherein the computer-executable instructions further cause the computing device to:

send a notification from the connection broker module to the remote desktop module;

cause the remote desktop module to display the notification on the first remote device; and prevent the display of the notification on the second remote device.

16. The computing device of claim 1, wherein the usage statistics includes a bandwidth usage.

17. The computing device of claim 1, wherein the usage statistics includes a number of involuntary disconnections.

18. The computing device of claim 1, wherein the usage statistics includes a number of collaborators.

19. The computing device of claim 1, wherein the usage statistics includes an amount of time the remote device is idle during a remote desktop session.

20. The computing device of claim 1, wherein the usage statistics includes a rate of pixel change.

21. The computing device of claim 1, wherein the usage statistics includes a timestamp associated with periods of utilization.

* * * * *